United States Patent
Amano

(10) Patent No.: US 10,558,513 B2
(45) Date of Patent: Feb. 11, 2020

(54) SYSTEM MANAGEMENT APPARATUS AND SYSTEM MANAGEMENT METHOD

(71) Applicant: Hitachi Power Solutions Co., Ltd., Ibaraki (JP)

(72) Inventor: Kouji Amano, Tokyo (JP)

(73) Assignee: Hitachi Power Solutions Co., Ltd., Ibaraki (JP)

( * ) Notice: Subject to any disclaimer, the term of this patent is extended or adjusted under 35 U.S.C. 154(b) by 94 days.

(21) Appl. No.: 15/546,480

(22) PCT Filed: Jan. 30, 2015

(86) PCT No.: PCT/JP2015/052630
§ 371 (c)(1),
(2) Date: Jul. 26, 2017

(87) PCT Pub. No.: WO2016/121085
PCT Pub. Date: Aug. 4, 2016

(65) Prior Publication Data
US 2018/0196708 A1    Jul. 12, 2018

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01); *G06F 11/0709* (2013.01); *G06F 11/0787* (2013.01)

(58) Field of Classification Search
CPC .. G06F 11/079; G06F 11/0709; G06F 11/076; G06F 11/0787; G06F 11/07;
(Continued)

(56) References Cited

U.S. PATENT DOCUMENTS 8,806,277 B1 * 8/2014 Mullangath ......... G06F 11/0709
714/26
2005/0076052 A1    4/2005 Kojima
(Continued)

FOREIGN PATENT DOCUMENTS

JP    2004-164389 A    6/2004
JP    2005-208707 A    8/2005
(Continued)

OTHER PUBLICATIONS

International Search Report of PCT/JP2015/052630 dated Apr. 21, 2015.

*Primary Examiner* — Anthony J Amoroso
(74) *Attorney, Agent, or Firm* — Mattingly & Malur, PC

(57) ABSTRACT

A system management apparatus includes a storing unit that stores structured identification information indicating physical and logical inclusion relations of configuration elements which configure a system by a tree structure, and correlation information indicating information on a correlation between the configuration elements, and a control unit that manages a range relating to a failure which is generated in the system, based on the structured identification information and the correlation information, in which the control unit designates a subset of the structured identification information as a predetermined management range in the structured identification information, and transmits failure information which is generated in the system to a terminal that displays the management range, in a case where the structured identification information indicating the failure information which is generated in the system corresponds to the subset of the structured identification information which is designated as a management range.

8 Claims, 17 Drawing Sheets

(58) Field of Classification Search
CPC ............. G06F 11/0703; G06F 11/0751; G06F 11/0754; G06F 11/0766; G06F 11/0769; G06F 11/0775; G06F 11/0778
USPC .................................. 714/37, 39–44, 48–49
See application file for complete search history.

(56) References Cited

U.S. PATENT DOCUMENTS

| | | |
|---|---|---|
| 2005/0156732 A1 | 7/2005 | Matsumura |
| 2008/0222456 A1* | 9/2008 | Jones ................ G06F 11/0709 714/45 |
| 2009/0216867 A1* | 8/2009 | Pusateri ............... H04L 41/022 709/222 |
| 2011/0264956 A1* | 10/2011 | Ito ....................... G06F 11/0748 714/20 |
| 2012/0117226 A1* | 5/2012 | Tanaka ................ H04L 41/0266 709/224 |
| 2013/0073271 A1* | 3/2013 | Xiang ................ G05B 23/0248 703/6 |

FOREIGN PATENT DOCUMENTS

| | | |
|---|---|---|
| JP | 2008-186401 A | 8/2008 |
| JP | 4174497 A | 10/2008 |
| JP | 2012-099048 A | 5/2012 |

* cited by examiner

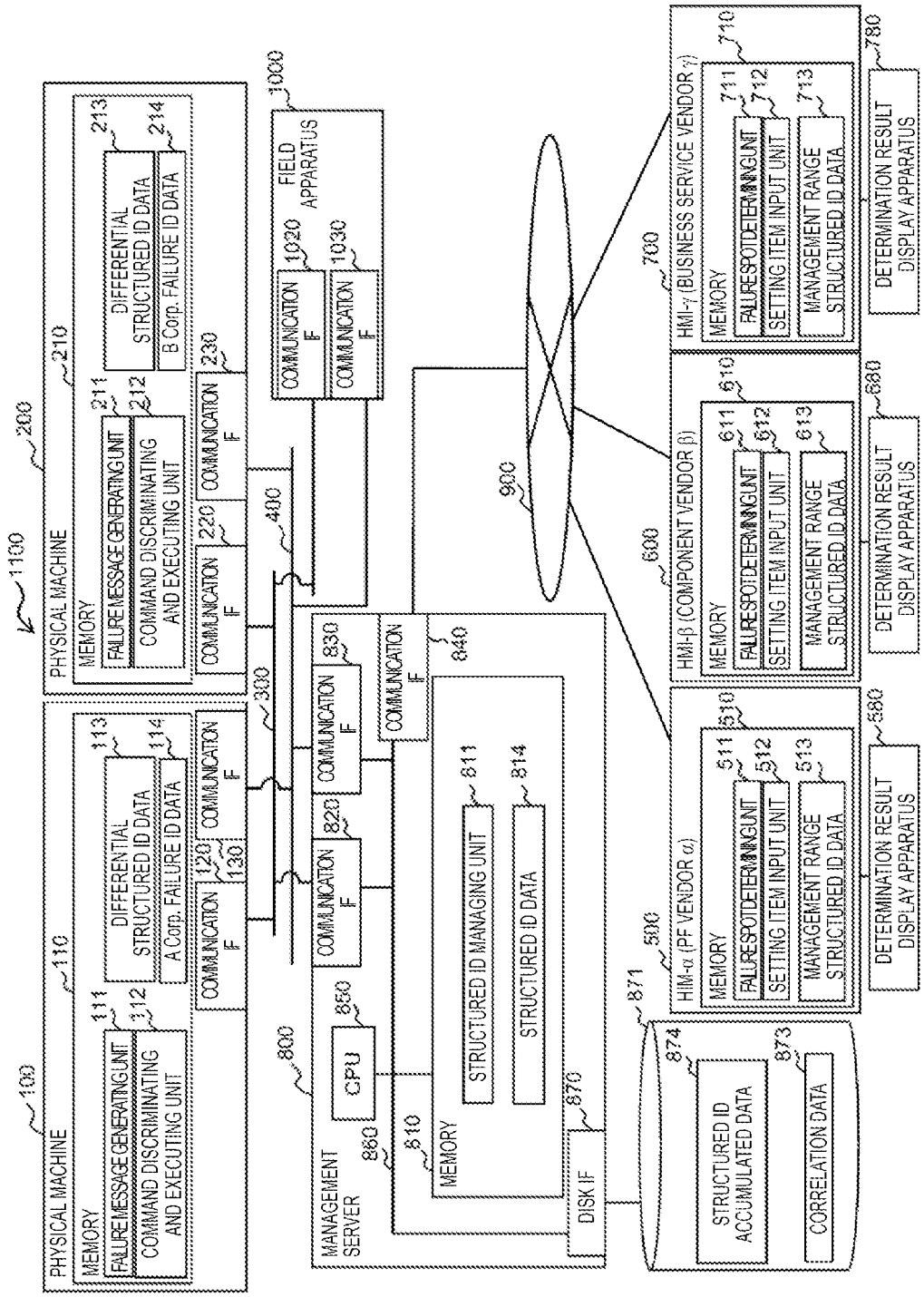
[Fig. 1]

[Fig. 2]
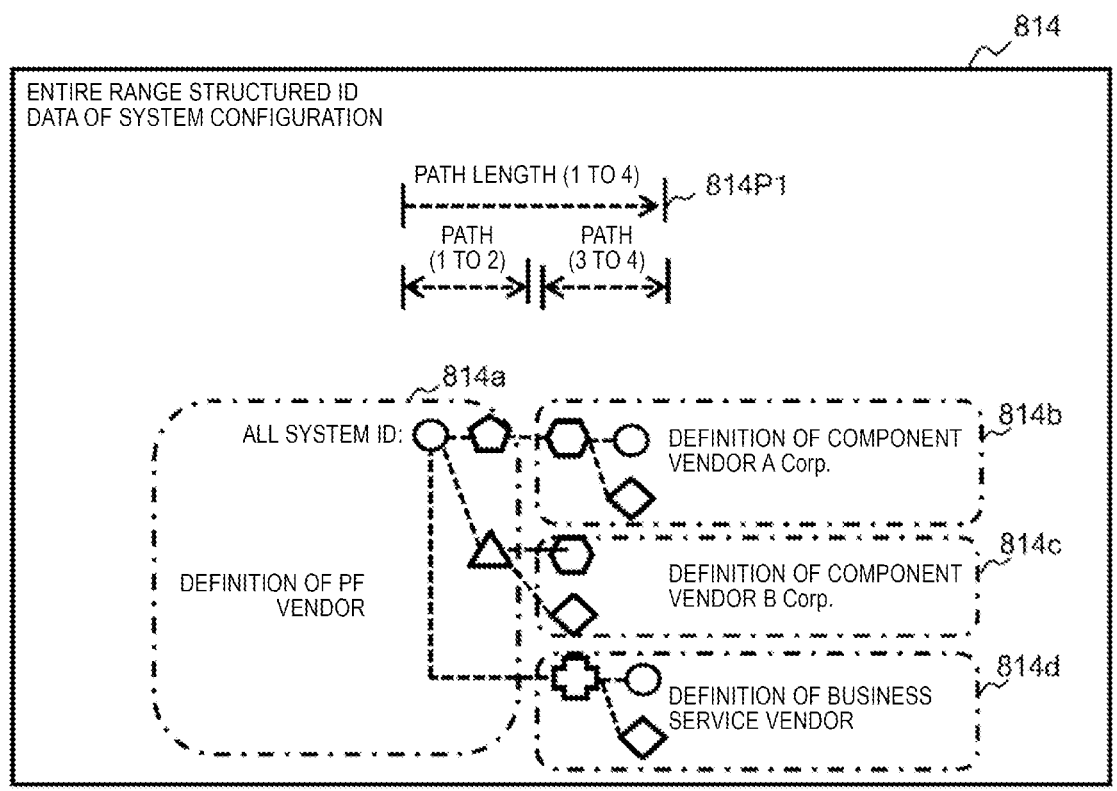

[Fig. 3]
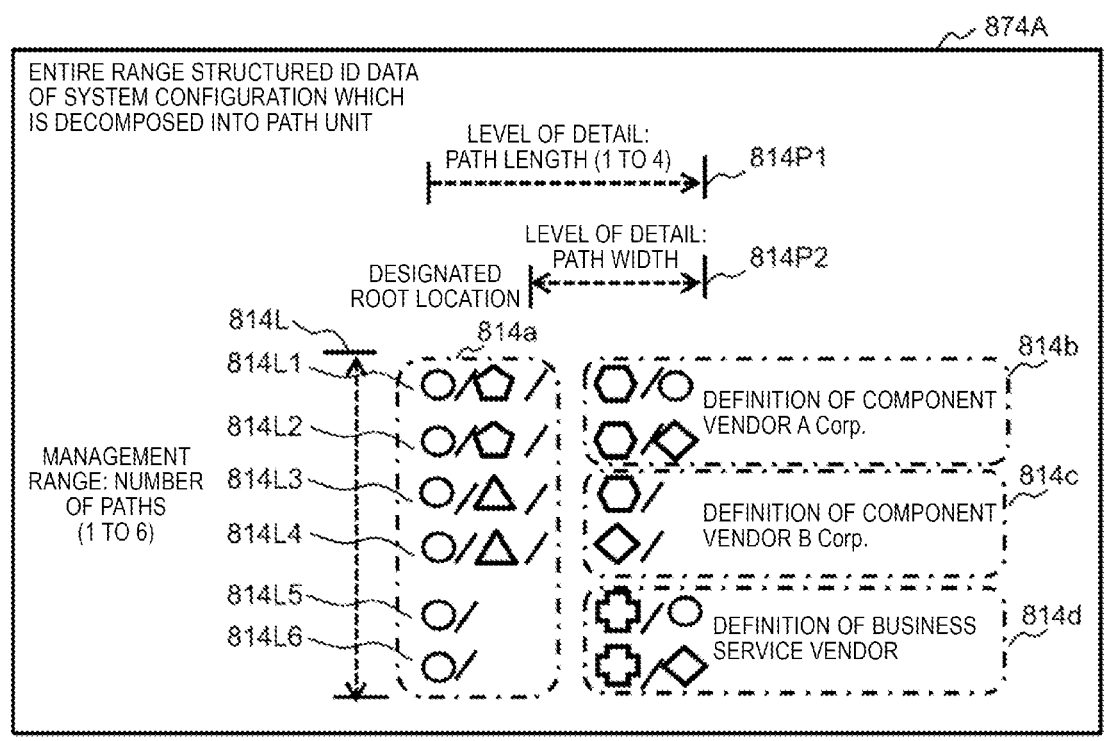

[Fig. 4]

| STRUCTURED ID | OWNER | EVALUATION VALUE | TARGET IDENTIFIER |
|---|---|---|---|
| ALL SYSTEM | α | | ALL SYSTEM |
| ALL SYSTEM/NETWORK 1 | α | 1 | NETWORK |
| ALL SYSTEM/NETWORK 2 | α | 1 | NETWORK |
| ALL SYSTEM/PHYSICAL MACHINE 1 | α | | PHYSICAL MACHINE |
| ALL SYSTEM/PHYSICAL MACHINE 2 | α | | PHYSICAL MACHINE |
| ALL SYSTEM/PHYSICAL MACHINE 1/MEMORY | β 1 | | MEMORY |
| ALL SYSTEM/PHYSICAL MACHINE 2/MEMORY | β 2 | | MEMORY |
| ALL SYSTEM/PHYSICAL MACHINE 1/MEMORY/FAILURE MESSAGE GENERATING UNIT | β 1 | 1 | PF MANAGEMENT APP |
| ALL SYSTEM/PHYSICAL MACHINE 1/MEMORY/COMMAND DISCRIMINATION AND EXECUTING UNIT | β 1 | 1 | PF MANAGEMENT APP |
| ALL SYSTEM/PHYSICAL MACHINE 2/MEMORY/FAILURE MESSAGE GENERATING UNIT | β 2 | 1 | PF MANAGEMENT APP |
| ALL SYSTEM/PHYSICAL MACHINE 2/MEMORY/COMMAND DISCRIMINATING AND EXECUTING UNIT | β 2 | 1 | PF MANAGEMENT APP |
| ALL SYSTEM/PHYSICAL MACHINE 1/REDUNDANT COMMUNICATION IF | β 1 | 1 | REDUNDANT COMMUNICATION IF |
| ALL SYSTEM/PHYSICAL MACHINE 2/REDUNDANT COMMUNICATION IF | β 2 | 1 | REDUNDANT COMMUNICATION IF |
| ALL SYSTEM/PHYSICAL MACHINE 1/REDUNDANT COMMUNICATION IF/COMMUNICATION IF 1 | β 1 | 1 | COMMUNICATION IF |
| ALL SYSTEM/PHYSICAL MACHINE 1/REDUNDANT COMMUNICATION IF/COMMUNICATION IF 2 | β 1 | 1 | COMMUNICATION IF |
| ALL SYSTEM/PHYSICAL MACHINE 2/REDUNDANT COMMUNICATION IF/COMMUNICATION IF 1 | β 2 | 1 | COMMUNICATION IF |
| ALL SYSTEM/PHYSICAL MACHINE 2/REDUNDANT COMMUNICATION IF/COMMUNICATION IF 2 | β 2 | 1 | COMMUNICATION IF |
| ALL SYSTEM/FIELD APPARATUS | γ | 1 | FIELD APPARATUS |
| ALL SYSTEM/PHYSICAL MACHINE 1/ERROR/NON-REBOOTABLE ABNORMALITY | α | 1 | PF VENDOR ABSTRACT ERROR |
| ALL SYSTEM/PHYSICAL MACHINE 1/ERROR/REBOOTABLE ABNORMALITY | α | 1 | PF VENDOR ABSTRACT ERROR |
| ALL SYSTEM/PHYSICAL MACHINE 1/MEMORY/COMMUNICATION IF/ERROR/Error001 | β 1 | 1 | VENDOR UNIQUE ERROR ID |

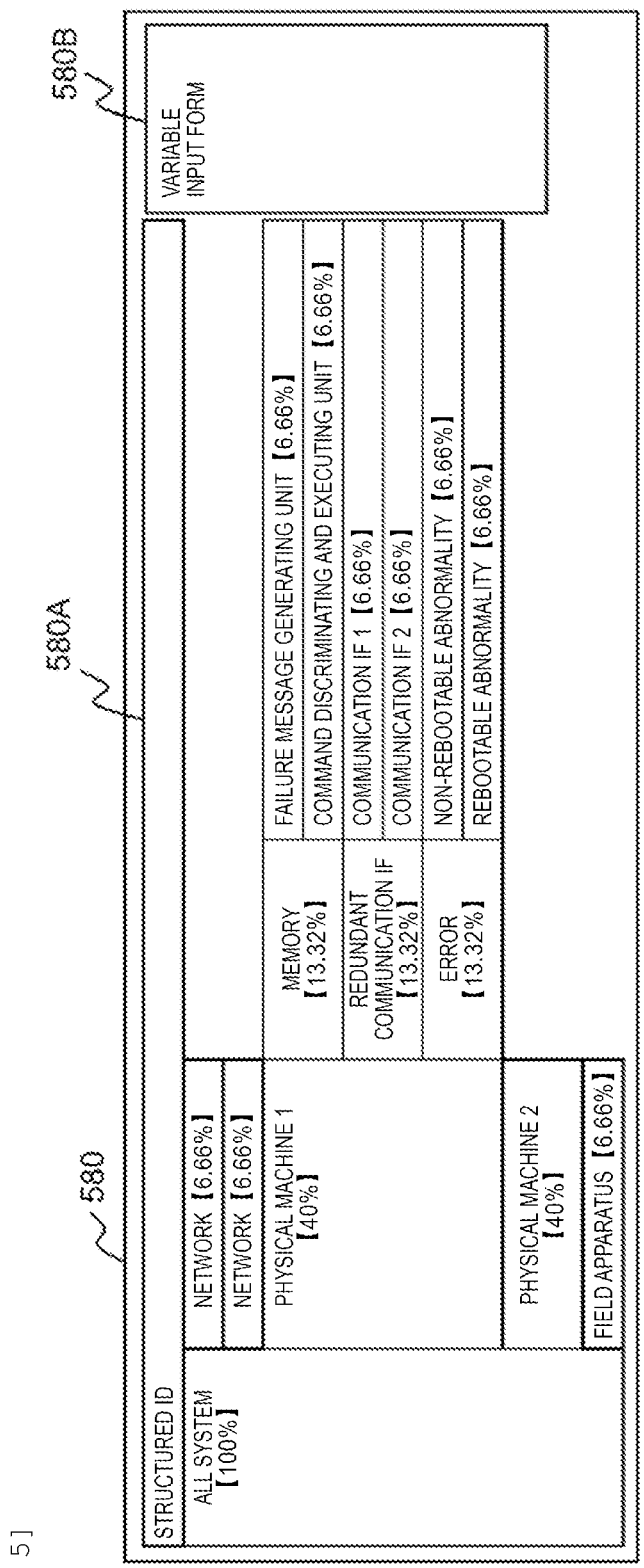
[Fig. 5]

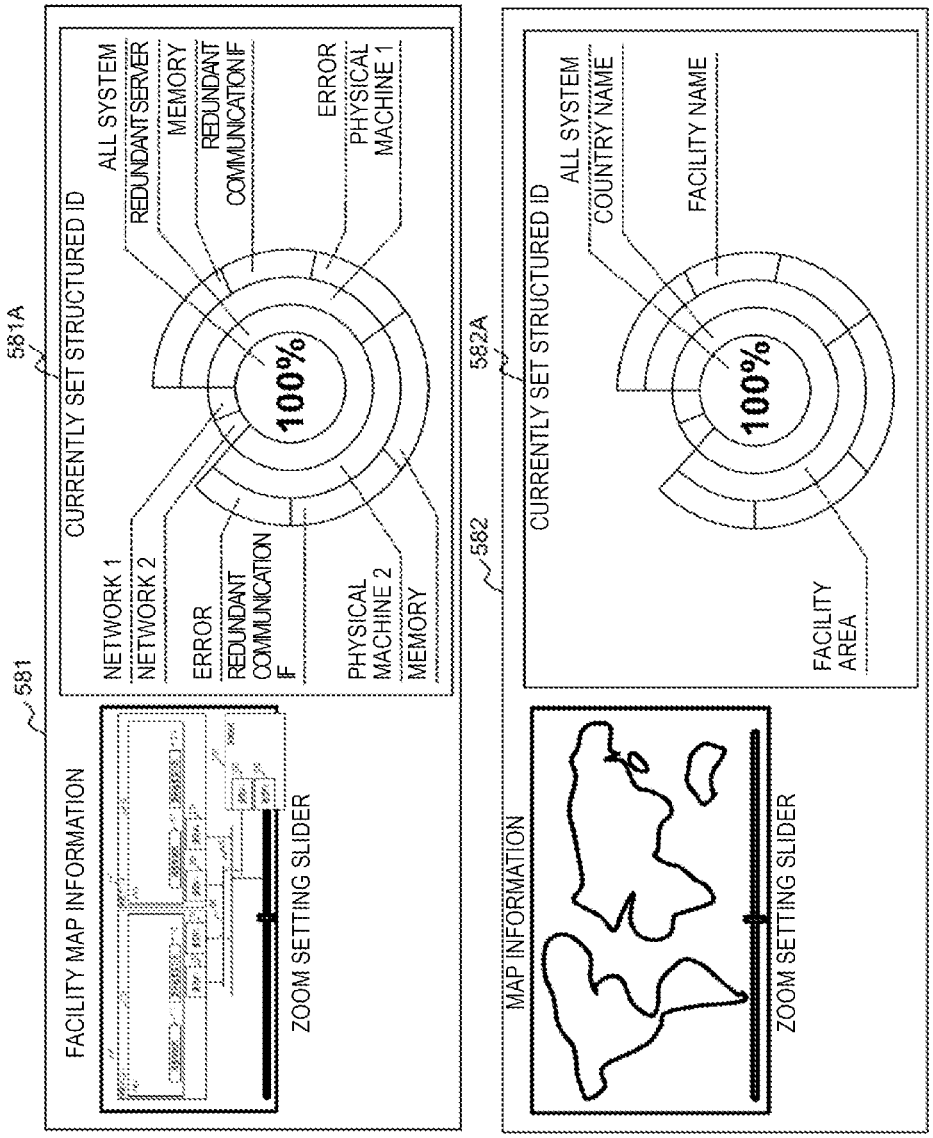
[Fig. 6]

[Fig. 7A]
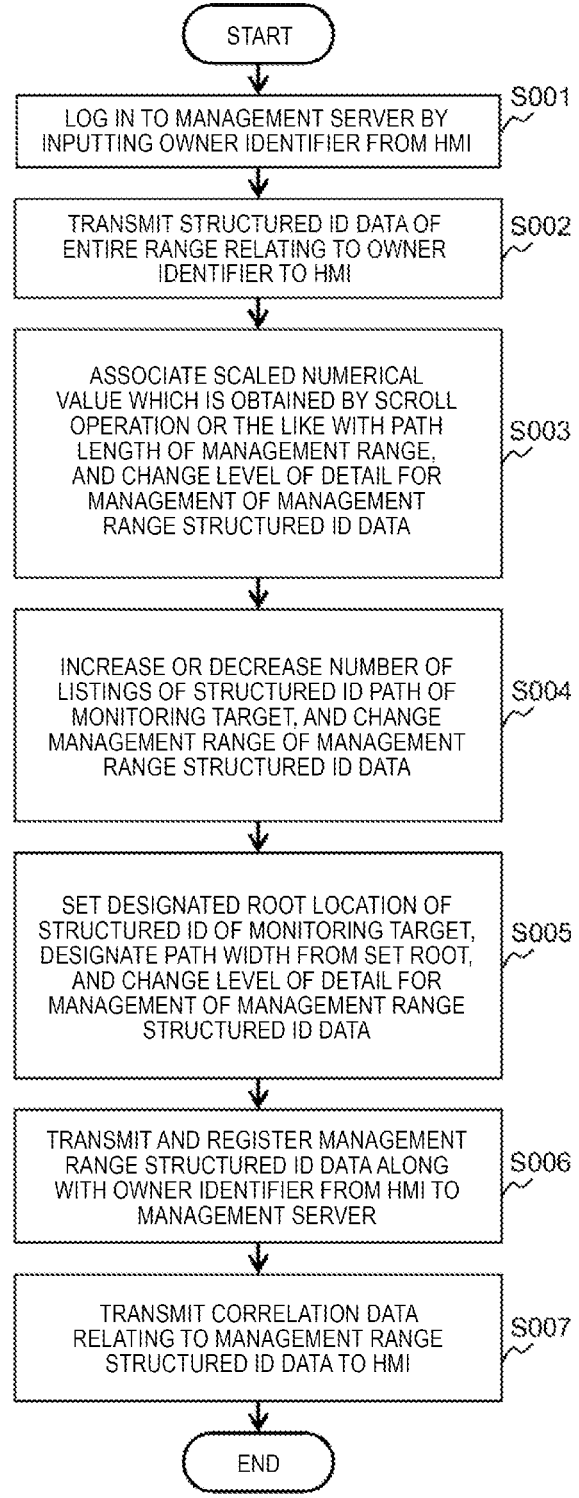

[Fig. 7B]
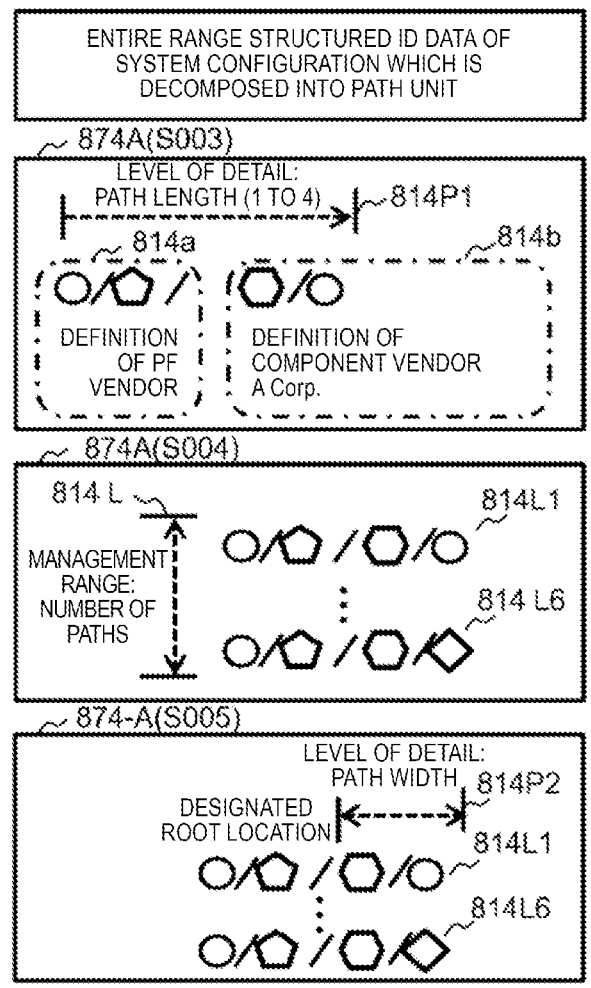

| FAILURE LINK SOURCE: Name,    FAILURE LINK DESTINATION: Link |
|---|
| Name="ALL SYSTEM/PHYSICAL MACHINE 1/REDUNDANT COMMUNICATION IF/COMMUNICATION IF 1 /ERROR/Error001", <br> Link=["ALL SYSTEM/PHYSICAL MACHINE 1/REDUNDANT COMMUNICATION IF/COMMUNICATION IF 1", <br> "ALL SYSTEM/REDUNDANT SERVER/PHYSICAL MACHINE 1/"] |
| Name="ALL SYSTEM/PHYSICAL MACHINE 1/REDUNDANT COMMUNICATION IF/COMMUNICATION IF 1 /ERROR/Error002", <br> Link=["ALL SYSTEM/REDUNDANT SERVER/PHYSICAL MACHINE 1/REDUNDANT COMMUNICATION IF /COMMUNICATION IF 1"} |
| Name="ALL SYSTEM/REDUNDANT SERVER/PHYSICAL MACHINE 1/100/CPU170/ERROR/PM01_Error002", <br> Link=["ALL SYSTEM/REDUNDANT SERVER/PHYSICAL MACHINE 1", <br> "ALL SYSTEM/REDUNDANT SERVER/PHYSICAL MACHINE 1/100", <br> "ALL SYSTEM/REDUNDANT SERVER/PHYSICAL MACHINE 1/100/CPU170", <br> "ALL SYSTEM/REDUNDANT SERVER/PHYSICAL MACHINE 1/ERROR/NON-REBOOTABLE ABNORMALITY"] |

[Fig. 8B]
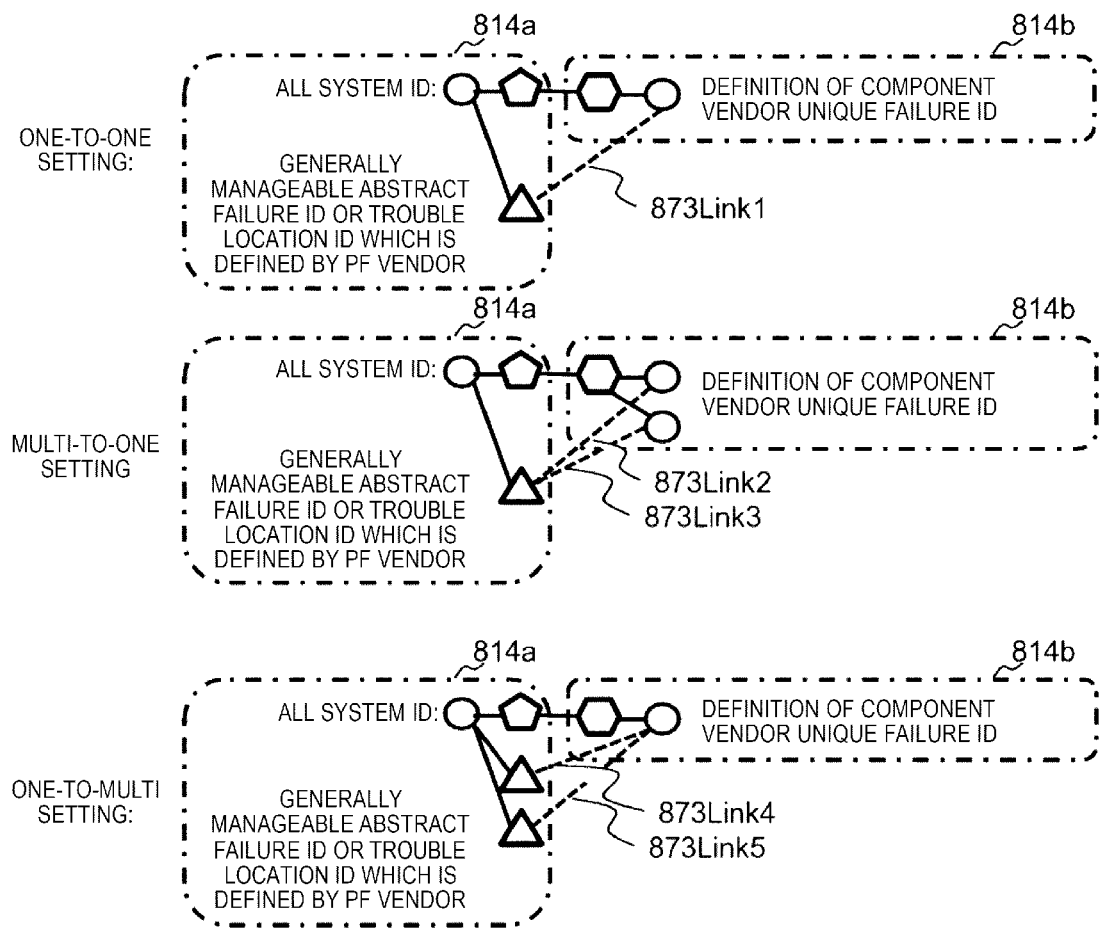

[Fig. 9A]
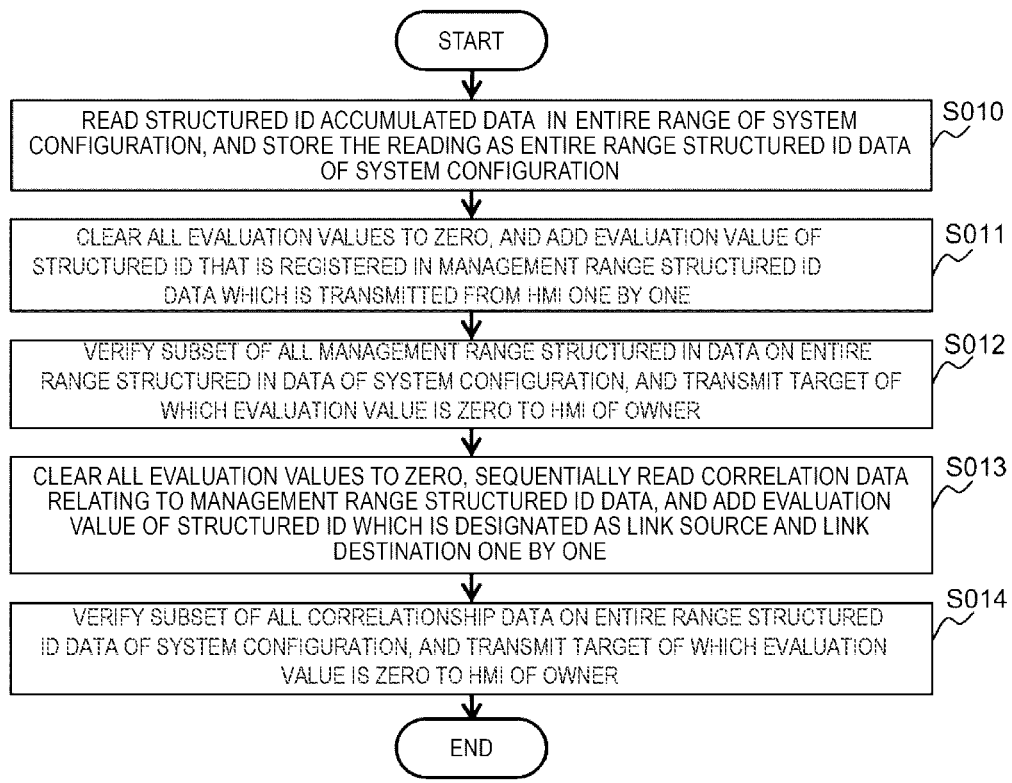

[Fig. 9B]

| STRUCTURED ID | OWNER | EVALUATION VALUE | TARGET IDENTIFIER |
|---|---|---|---|
| ALL SYSTEM | α | 0 | ALL SYSTEM |
| ALL SYSTEM/NETWORK 1 | α | 1 | NETWORK |
| ALL SYSTEM/NETWORK 2 | α | 1 | NETWORK |
| ALL SYSTEM/PHYSICAL MACHINE 1 | α | 1 | PHYSICAL MACHINE |
| ALL SYSTEM/PHYSICAL MACHINE 2 | α | 1 | PHYSICAL MACHINE |
| ... | ... | ... | ... |
| ALL SYSTEM/FIELD APPARATUS | γ | 0 | FIELD APPARATUS |
| ALL SYSTEM/PHYSICAL MACHINE 1/ERROR/NON-REBOOTABLE ABNORMALITY | α | 1 | PF VENDOR ABSTRACT ERROR |
| ALL SYSTEM/PHYSICAL MACHINE 1/ERROR/REBOOTABLE ABNORMALITY | α | 0 | PF VENDOR ABSTRACT ERROR |
| ALL SYSTEM/PHYSICAL MACHINE 1/MEMORY/COMMUNICATION IF/ERROR/Error001 | β 1 | 0 | VENDOR UNIQUE ERROR ID |

[Fig. 10A]
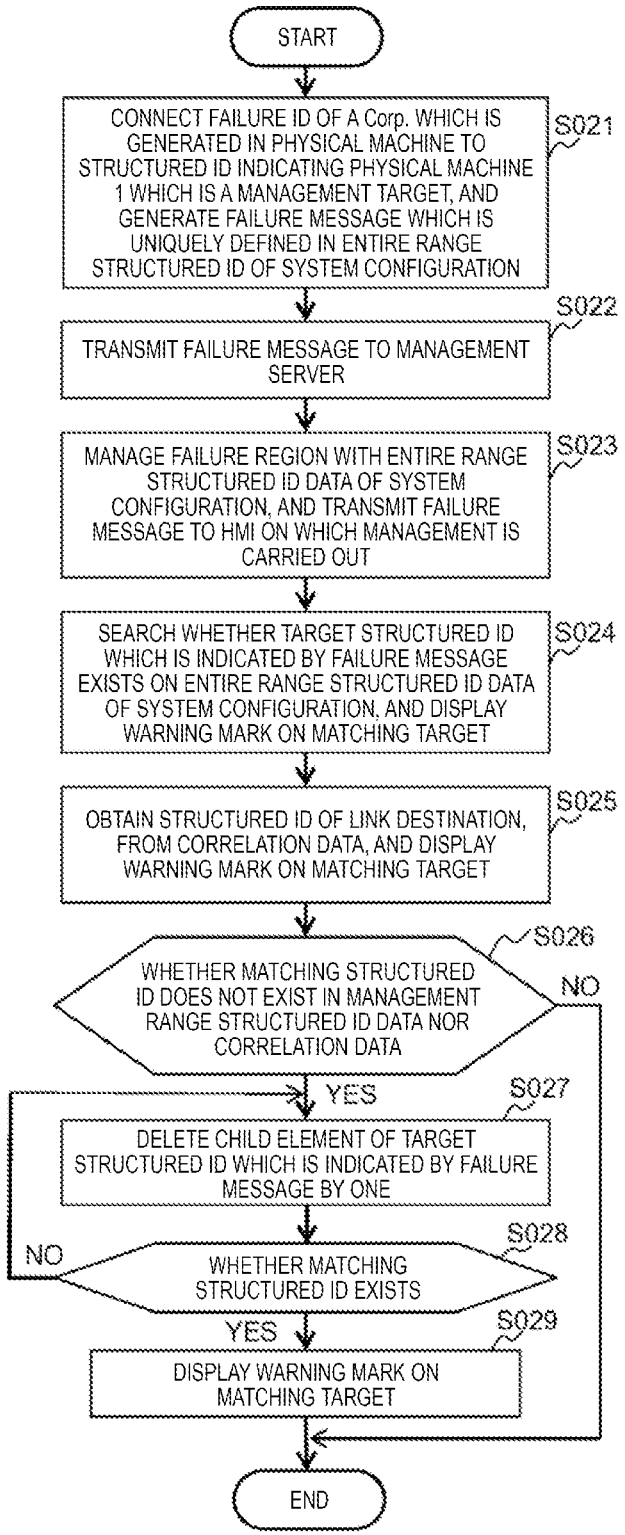

[Fig. 10B]
COMPOSITION OF DIFFERENTIAL STRUCTURED ID
(S021)
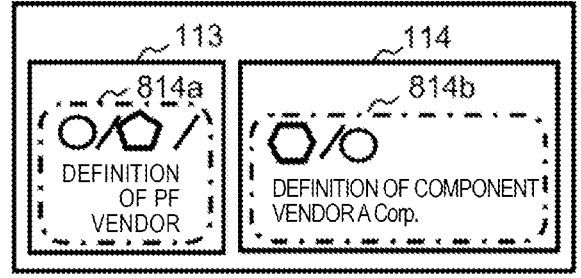
⬇
STRUCTURED ID IN WHICH COMPOSITION OF
DIFFERENTIAL STRUCTURED ID IS PERFORMED
(S021)
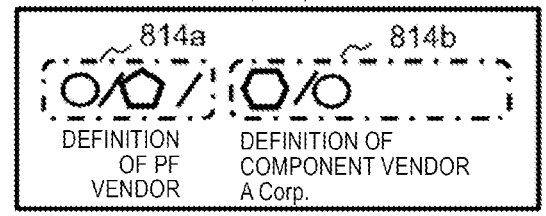
⬇
DETERMINATION OF FAILURE SPOT (S207)
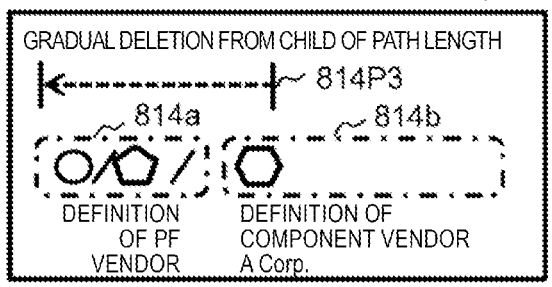

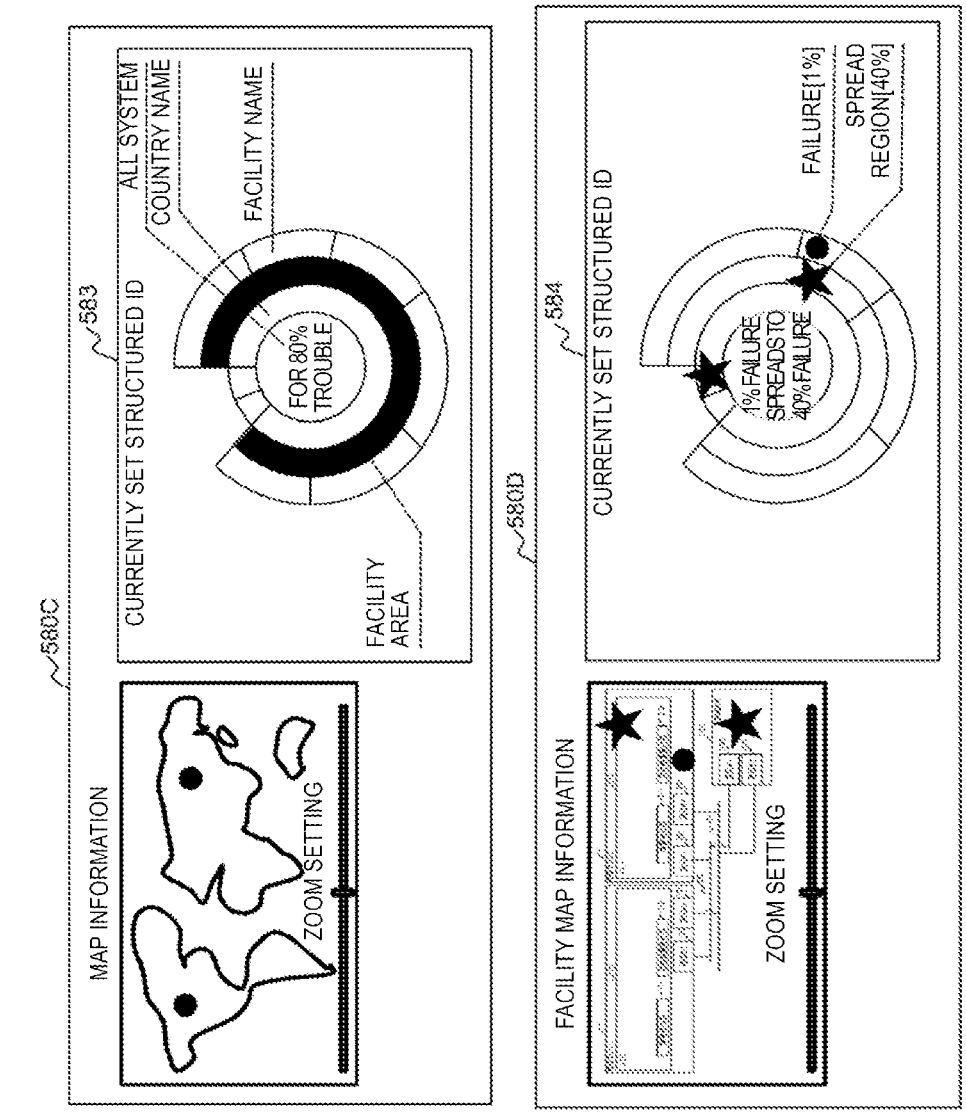
[Fig. 11]

[Fig. 12]
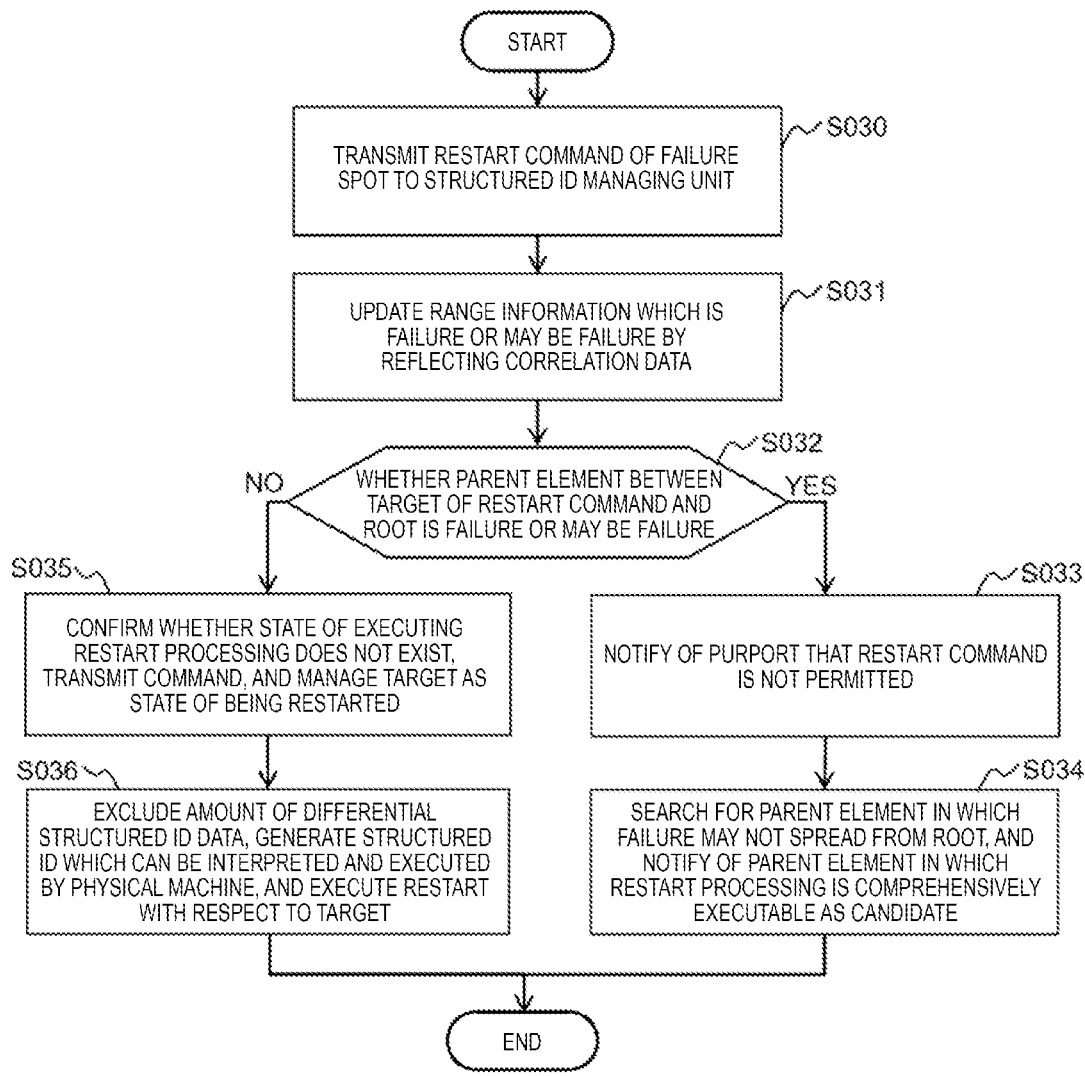

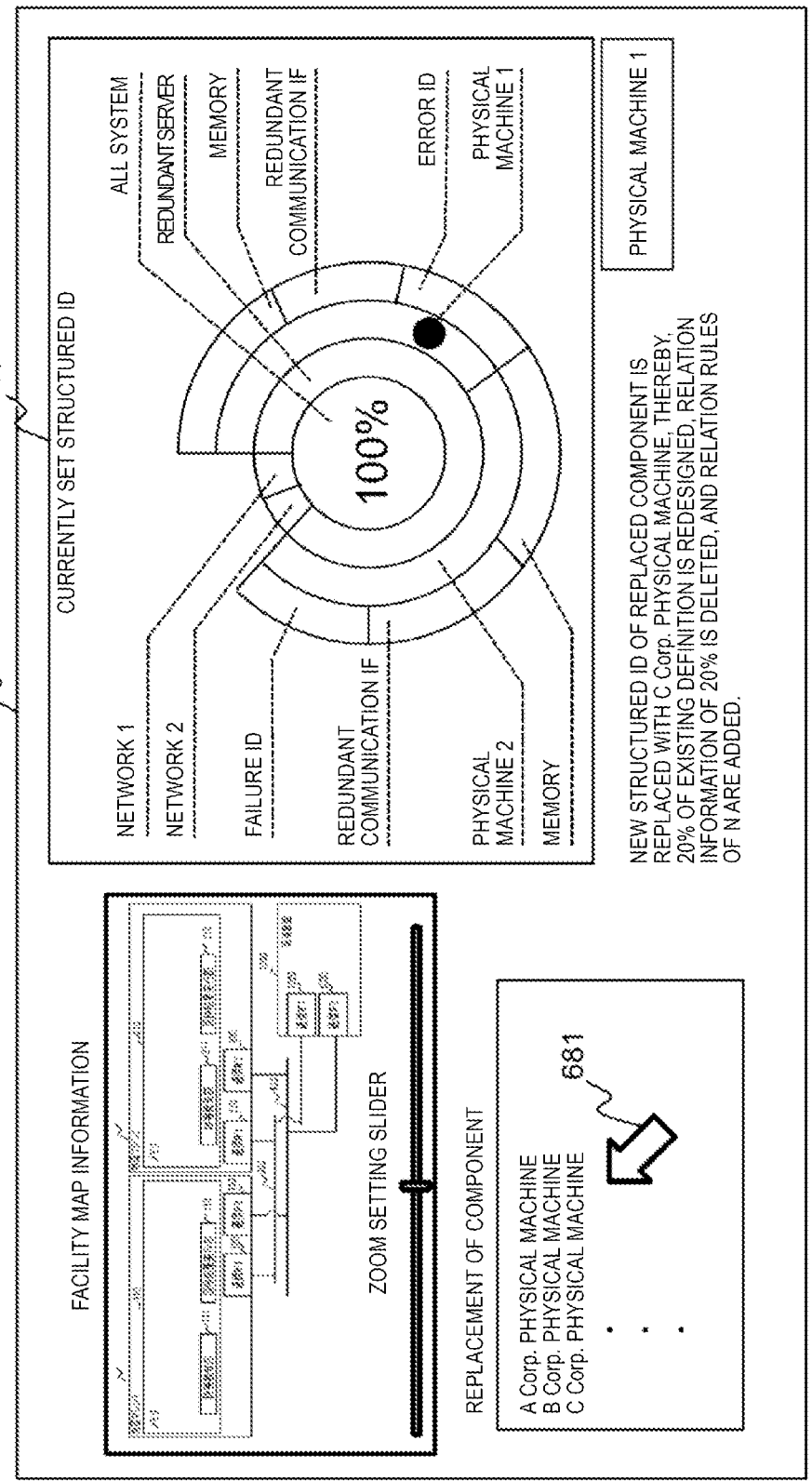
[Fig. 13]

SYSTEM MANAGEMENT APPARATUS AND SYSTEM MANAGEMENT METHOD

TECHNICAL FIELD

The present invention relates to a system management apparatus and a system management method, and is suitable to be applied to a system management apparatus and a system management method that manage a multi-architecture system.

BACKGROUND ART

Recently, development of a technology of which an object is to improve reliability from a design to an operation of a system has been performed. For example, PTL 1 discloses a technology of improving the reliability of the system in which a fault tree analysis (which is also referred to as an FTA, hereinafter) is used. By this technology, it is possible to evaluate the reliability of the system by calculating a pre-generation probability of a failure, with respect to a failure event which ought to be avoided to be generated, and a cause event which leads to the failure.

CITATION LIST

Patent Literature

PTL 1: Japanese Patent No. 4174497

SUMMARY OF INVENTION

Technical Problem

In a case where the reliability of the system is evaluated by using an FTA method at a design stage of the system, a single vendor is designed at the same timing, thereby, it is possible to carry out an analysis of the reliability of the system or the like. However, in the FTA method, since the reliability of the system is evaluated by calculating a generation probability of a trouble from a leaf element of the system, it is not possible to evaluate the reliability of the system unless all configuration elements exist.

Currently, increased are more cases where devices which are manufactured by a plurality of vendors and functional components are mixed in the configuration element of the system. In this manner, the case where the devices which are manufactured by the plurality of vendors and the functional components are mixed in the configuration element of the system is called as a multi-architecture. If making of the multi-architecture or componentization proceeds, since the timings at which the respective configuration elements of the system are designed are different from each other, design information is fragmented, thereby, it is not possible to secure consistency of a system design. In this case, in the respective vendors such as a platform design vendor (hereinafter, there is a case where the platform vendor is referred to as a PF vendor), a component vendor, or a business service vendor, it is not possible to confirm the consistency of the data of the systems which are individually designed, and inconsistency such that control information of the configuration is overlapped or a leakage of a control range occurs may be generated.

The present invention is made in consideration of the above points, and makes a proposal of a system management apparatus and a system management method that are capable of providing failure information of a desired range by managing reliability in a multi-architecture system in a unified manner.

Solution to Problem

In order to solve such a problem, according to the present invention, there is provided a system management apparatus including a storing unit that stores structured identification information indicating physical and logical inclusion relations of configuration elements which configure a system by a tree structure, and correlation information indicating information on a correlation between the configuration elements, and a control unit that manages a range relating to a failure which is generated in the system, based on the structured identification information and the correlation information, in which the control unit designates a subset of the structured identification information as a predetermined management range in the structured identification information, and transmits failure information which is generated in the system to a terminal that displays the management range, in a case where the structured identification information indicating the failure information which is generated in the system corresponds to the subset of the structured identification information which is designated as a management range.

In order to solve such a problem, according to the present invention, there is provided a system management method of a system management apparatus including a storing unit that stores structured identification information indicating physical and logical inclusion relations of configuration elements which configure a system by a tree structure, and correlation information indicating information on a correlation between the configuration elements, and a control unit that manages a range relating to a failure which is generated in the system, based on the structured identification information and the correlation information, the method including a step of designating a subset of the structured identification information as a predetermined management range in the structured identification information by the control unit, a step of determining whether the structured identification information indicating failure information which is generated in the system corresponds to the subset of the structured identification information which is designated as a management range by the control unit, and a step of transmitting the failure information which is generated in the system to a terminal that displays the management range by the control unit, in a case where the structured identification information indicating the failure information which is generated in the system corresponds to the subset of the structured identification information which is designated as a management range.

Advantageous Effects of Invention

According to the present invention, it is possible to provide failure information of a desired range by managing reliability in a multi-architecture system in a unified manner, and it is possible to achieve improvement in the reliability of the system.

BRIEF DESCRIPTION OF DRAWINGS

FIG. 1 is a block diagram illustrating a system configuration of a management system according to an embodiment of the present invention.

FIG. 2 is a diagram for describing a concept of a structured ID according to the embodiment.

FIG. 3 is a diagram for describing an example which is obtained by decomposing or making a tree structure of the structured ID into a character string according to the embodiment.

FIG. 4 is a chart illustrating content of structured ID accumulated data of the system configuration according to the embodiment.

FIG. 5 is a conceptual diagram illustrating a display example of a composition result of the structured ID according to the embodiment.

FIG. 6 is a conceptual diagram illustrating a screen display example of the structured ID according to the embodiment.

FIG. 7A is a flowchart illustrating a flow of a management range setting processing according to the embodiment.

FIG. 7B is a conceptual diagram illustrating an outline of structured ID data indicating a management range according to the embodiment.

FIG. 8A is a conceptual diagram illustrating an example of correlation data according to the embodiment.

FIG. 8B is a diagram for describing an outline of the correlation data according to the embodiment.

FIG. 9A is a flowchart illustrating a flow of a completeness verification processing of the management range and a relational link according to the embodiment.

FIG. 9B is a chart illustrating the content of the structured ID accumulated data of an entire range according to the embodiment.

FIG. 10A is a flowchart illustrating a flow of a failure information display processing according to the embodiment.

FIG. 10B is a conceptual diagram illustrating composition and deletion of a structured ID path according to the embodiment.

FIG. 11 is a conceptual diagram illustrating a display example of a failure region and a spread range according to the embodiment.

FIG. 12 is a flowchart illustrating a flow of a failure recovery command collision avoiding processing and a configuration control executing processing according to the embodiment.

FIG. 13 is a conceptual diagram illustrating an outline of a partial system change using structured ID information or relation information according to the embodiment.

DESCRIPTION OF EMBODIMENTS

Hereinafter, an embodiment of the present invention will be described in detail with reference to the drawings.

(1) Outline of the Embodiment

First, an outline of the embodiment will be described. As described above, if making of a multi-architecture or componentization proceeds, since the timings at which the respective configuration elements of a system are designed are different from each other, design information is fragmented, thereby, it is not possible to secure consistency of a system design. In order to enhance interconnectivity of the multi-architecture, there are various international standard levels, but an identifier for managing a failure of the system has high dependency on a vendor, and is less likely to be managed in a unified manner.

In a field of a system management, a configuration change of a screen, or a change of a level of detail in the display is asked depending on an attention degree of an operator, and a demand to perform a management with an abstract concept in which a plurality of vendors are concealed, and a demand to manage up to a vendor unique failure identifier in detail are mixed.

In managing of a life cycle of the system in accordance with the multi-architecture, since a variation occurs in the life cycles of parts which configure the system, a partial replacement is generated. A function of quantitatively evaluating a range in which the system design is affected by the partial replacement is asked.

In the embodiment, it is possible to provide failure information of a desired range, by managing reliability in a multi-architecture system in a unified manner. Specifically, it is possible to set structured identifier information (which is referred to as a structured ID, hereinafter) with a nested structure in which the identifiers of the configuration elements of the systems that are individually designed depending on the respective vendors are adapted to a system structure, and it is possible to manage the configuration element and the failure information of the system in a unified manner by a tree structure.

(2) Configuration of Management System

Hereinafter, a case where the structured ID is set into the configuration elements of the system and the like which are designed by a platform vendor, a component vendor, and a business service vendor, and the configuration elements of the system and the like are managed in a unified manner by the tree structure, will be described.

With reference to FIG. 1, a system configuration of a management system 1100 will be described. As illustrated in FIG. 1, the management system 1100 is provided with a physical machine 100, a physical machine 200, a management server 800, a field apparatus 1000, a terminal 500 for a platform vendor, a terminal 600 for a component vendor, a terminal 700 for a business service vendor, and the like.

The management server 800 is provided with a memory 810, a communication interface (communication IF in the drawing) 820, a communication interface (communication IF in the drawing) 830, a communication interface (communication IF in the drawing) 840, a CPU 850, a bus 860, a disk interface (disk IF in the drawing) 870, and the like.

The CPU 850 functions as an arithmetic processing apparatus, and controls an operation of the management server 800 in accordance with a program, an arithmetic parameter, and the like which are stored in the memory 810. The CPU 850 performs transmission of a command or the like through the bus 860, and executes each processing.

The communication interfaces 820, 830, and 840 are communication apparatuses that are provided with a communication device and the like, and may be a wireless LAN (Local Area Network) compatible communication apparatus, a wireless USB compatible communication apparatus, or a wire communication apparatus that performs the communication in a wired manner.

In the embodiment, a structured ID managing unit 811, and a structured ID data 814 are stored in the memory 810. The structured ID managing unit 811 has a function of managing the system configuration of a management target by using the structured ID. The structured ID data 814 is structured ID data indicating the system configuration of the management target. The structured ID data will be described in detail later.

The management server 800 includes an information input apparatus such as a keyboard, a switch, a pointing device, or a microphone, and an information output apparatus such as a monitor display or a speaker.

Furthermore, the management server 800 may include a storage apparatus 871 for storing the data. The storage apparatus 871 includes a storing medium, a storing apparatus that stores the data in the storing medium, a reading apparatus that reads the data from the storing medium, and a deleting apparatus that deletes the data which is stored in the storing medium. For example, the storage apparatus 871 is configured with an HDD (Hard Disk Drive), drives the hard disk, and stores the program executed by the CPU, and various types of data. In the embodiment, a structured ID accumulated data 874, and a correlation data 873 are stored in the storage apparatus 871. Each data will be described in detail later.

The structured ID managing unit 811 in the management server 800 provides the function through a wide area network 900 such as the Internet, and has an HMI (Human Machine Interface) terminal as an information processing apparatus for an input of various types of data and a display of a determination result. In the embodiment, as described above, in order to set the structured ID with respect to the configuration elements of the system and the like which are designed by the platform vendor, the component vendor, and the business service vendor, the vendors respectively have the HMI terminals.

That is, an HMI terminal for a platform vendor (PF vendor in the drawing) α is referred to as an HMI-α 500, an HMI terminal for a component vendor β is referred to as an HMI-β 600, and an HMI terminal for a business service vendor γ is referred to as an HMI-γ 700. In the same manner as the management server 800, the HMI terminals have CPUs, buses, communication IFs and the like, and realize the function and the communication on a memory 510.

The memory 510 of the HMI-α 500 for the platform vendor includes a failure spot determining unit 511, a setting item input unit 512 which has a setting item input logic, and a management range structured ID data 513, and includes a determination result display apparatus 580 for displaying a result and an input situation. Moreover, an information output apparatus such as a speaker is included. The HMI-β 600 and the HMI-γ 700 also have the same configurations as that of the HMI-α 500.

In the platform vendor, a reliability design for securing reliability is demanded. In the system design of the management system 1100, a multi-thread network is configured with networks 300 and 400, and the physical machine 100 and the physical machine 200 are provided as a platform of a computing machine.

The physical machine 100 includes a communication interface (communication IF in the drawing) 120, and a communication interface (communication IF in the drawing) 130, since there is a demand to make a communication circuit redundant. The physical machine 100 includes a memory 110, and in the memory 110, a failure message generating unit 111, a command discriminating and executing unit 112, a differential structured ID 113, and an A Corp. failure ID data 114 are stored.

At a stage in which the platform vendor designs the system, the system is determined to be designed into a multi-thread, but the component vendor of the physical machine is in an undetermined state. Finally, the physical machine is registered by each component vendor, and vendor unique management targets are increased. In FIG. 1, in the physical machine 100, the A Corp. unique failure ID data 114 which is adopted in the physical machine 100 exists, and in the physical machine 200, a B Corp. unique failure ID data 214 which is adopted in the physical machine 200 exists.

The differential structured ID data 113, and a differential structured ID data 213 are differential data of abstract structured IDs for identifying the physical machine 100 or the physical machine 200. By the differential structured ID data 113 or the differential structured ID data 213, it is possible to consistently identify the physical machine 100 or the physical machine 200, without depending on the unique failure ID data of which the platform vendor is the A Corp. or the B Corp.

The component vendor provides a component that coincides with specification which is demanded by the platform vendor. In the embodiment, a case where the physical machine 100 and the physical machine 200 are provided in accordance with the component vendor will be described by being used as an example.

The field apparatus 1000 is an apparatus that is provided by the business service vendor separately from the platform vendor and the component vendor. The field apparatus 1000 includes a CPU, a memory, and communication interfaces 1020 and 1030, in the same manner as other apparatuses. The field apparatus 1000 is out of a recognition range of the platform vendor or the component vendor, and is managed by the physical machine 100 and the physical machine 200, and may be referred to as a subordinate apparatus since the platform vendor or the component vendor only can manage the field apparatus 1000 indirectly. In such a subordinate apparatus, there is a need for relation information indicating a relation with the physical machine. For example, in a case where the physical machine is stopped due to the failure, the subordinate apparatus does not normally operate, that is, it is treated to be in the same state as a failure occurrence state.

By the above configuration, the management system 1100 provides a function of managing the computing machine which is provided by each vendor, the program of the business service vendor, the vendor unique failure ID, the subordinate apparatus, and the like in a unified manner.

(3) Regarding Concept of Structured ID

Next, a concept of the structured ID of the embodiment will be described. FIG. 2 is an example of the structured ID data in which the configuration elements of the systems individually designed by the three of the platform vendor, the component vendor, and the business service vendor are gradually set as a structured ID, and consistency is secured by the tree structure. For the following description, various types of IDs are exemplified by objects such as a circle, a pentagon, or a hexagon in FIG. 2, and a parent-child relationship is represented by a broken line between various types of IDs.

In the structured ID data 814 of the system configuration, a middle stage 814*a* from a root of the tree structure is set as an abstract concept by the platform vendor. Therefore, by the component vendor and the business service vendor, the structured IDs such as 814*b*, 814*c*, and 814*d* which are child elements are connected to the middle stage 814*a* of the structured ID.

For example, in a case where the A Corp. of the component vendor is adopted with respect to the physical machine 100, the structured ID 814*b* which is defined by the A Corp. is added to the middle stage 814*a* of the structured ID. In a case where the B Corp. of the component vendor is adopted with respect to the physical machine 200, the structured ID 814*c* which is defined by the B Corp. is added to the middle stage 814*a* of the structured ID. In the structured ID defining all system, the structured ID 814*d* that defines the field apparatus 1000 unique to the business service vendor is defined. In this manner, according to the embodiment, it is possible to uniquely define up to the configuration element which is provided by the component vendor or the business service vendor from all system, by the structured ID of the tree structure having consistency.

That is, in the embodiment, first, an ID that is invariably manageable is defined with respect to the middle stage 814*a* from the root of the tree structure. It is defined in the child element (814*b* to 814*d*) in which the replacement of the configuration element depending on the life cycle of the hardware, a heteroarchitecture for realizing a redundant system, or a software defined after the design of the hardware is added to the middle stage 814*a* of the tree structure. Accordingly, by using the structured data, it is possible to expand or limit a redesign range or a reevaluation range of the system, and it is possible to evaluate the system at not only the configuration element of the terminal but also a middle stage node which is a higher stage of the configuration element.

Next, with reference to FIG. 3, an example that is obtained by decomposing or making the tree structure of the structured ID which is manageable in a unified manner into a character string will be described. When a data scanning processing or a search processing is performed on the memory 810, the data which is managed as a tree structure is uniquely defined by a path which is to a leaf from the root, or is to each target from the root, from universal characteristics of the data of the tree structure. Therefore, a connection (link) of the configuration elements which configures the tree structure is represented by a delimiter character, for example, "/" slash or "." dot, thereby, it is possible to decompose the structured ID as a character string identifier which is used in various programs or a screen drawing identifier. In the embodiment, a case where one configuration element which configures the tree structure is referred to as a path will be described hereinafter.

As illustrated in FIG. 3, a range which becomes a management target is obtained by designating a path length 814P1, a path width 814P2 is changed by changing a location of a designated root of the path, or 814L1 to 814L6 of the number of paths are designated, thereby, it is possible to designate a subset of the configuration element which configures the system by using the structured ID. Accordingly, it is possible to limitedly designate the range which is desired by the operator, such as the management range of the system or the management range of the failure.

FIG. 4 is the structured ID accumulated data 874 of the system configuration which is stored in the storage apparatus 871. The structured ID accumulated data 874 is configured from a structured ID 874A, an owner 874B, an evaluation value 874C, and a target identifier 874D. The structured ID 874A is the structured ID data of the system configuration which is decomposed into a path unit. The owner 874B is the identification information of a registration vendor that is input at the time of the login to the HMI terminal. The evaluation value 874C is a quantitative evaluation value which is obtained by evaluating a calculation result of severity of the system or a leakage of monitoring. The target identifier 874D is an identification keyword for a reverse lookup of the structured ID from a search keyword in the HMI.

At the structured ID 874A, the complicated structure of the system is stored in the structured ID 874A which is decomposed as a character string identifier of the structured ID. The ownership information 874B, the evaluation value 874C of the system, and the identification information 874D of the system are associated with the system configuration which is indicated by the structured ID 874A.

In the structured ID data, it is possible to additionally write an abstract failure ID or a vendor unique failure ID, as a configuration element which is equivalent to the system configuration element. Accordingly, it is possible to register the failures IDs which scatteringly exist without being treated in a unified manner between the respective systems hitherto into a systematically unified structured ID.

(4) Screen Display Example of Structured ID

FIG. 5 is a display example of a composition result of the structured IDs that are displayed on a determination result display apparatus (580, 680, and 780) of the HMI terminal (HMI-α 500, HMI-β 600, and HMI-γ 700). As illustrated in the display example 580 in FIG. 5, by composing the paths of the respective structured IDs, the tree structure of the structured ID data 814 of an entire range of the system configuration is formed, and the tree structure as a nested structure is displayed on a display screen. That is, on the display screen illustrated in FIG. 5, it is possible to grasp how to configure the system which becomes the target, or it is possible to grasp the level of detail for a display range of the system.

The operator adjusts a display level by the input to an input form 580B, and adjusts the level of detail for the display. It is possible to change the range of the level of detail for the display, by designating the display level based on the owner information, or by designating the path length 814P1 illustrated in FIG. 2, the path list 814L, or the path designation 814P2.

For example, by selecting two lines of the path lists 814L1 and 814L2 as a list, in the range illustrating in FIG. 3, it is possible to limit only the range of the component vendor A Corp., from the range of all system. By replacing the designated root 814P2 from a path 1 to a path 2, it is possible to display the content of the close-up only from the common parent. By making the designated root 814P2 as it is, and by designating the level of detail into the path length 2 (814P1), it is possible to display only the abstract definition range of which the target is the platform vendor, and it is possible to display the information which is closed into a specific platform vendor.

The operator designates the display range as described above, thereby, it is possible to fold up the display of the definition on the detailed child element side of the component vendor, in a screen display example 580A, and it is possible to present the information which is necessary for the operator.

In the screen display example 580A, the display relating to the physical machine 2 is different from the display relating to the physical machine 1, the display path is set to be short, and the failed child element is folded up into a parent element. For example, the failed child element is an accumulated relative ratio or the like of the target in all system. In the accumulated relative ratio, a result in which an evaluation value which is obtained by tracing the tree structure from the parent element, and by tracing the tree structure that is to the parent element from the evaluation value 874C substantially given to the child element (leaf element) is added, is made as an evaluation value of the parent, and it is possible to calculate the accumulated relative ratio by dividing this evaluation value by all evaluation values. By the accumulated relative ratio, it is possible to quantitatively evaluate a damage which received by the system at the time of the failure. It is also possible to quantitatively perform the evaluation by the relative ratio which is obtained by making the root as 100%, and by dividing the number of children in sequence.

A screen display example 581 of the structured ID in FIG. 6 is an example in which the displayed range (designated root) is made as a facility map, and the level of detail the display of the structured ID is changed in connection with the map. A screen display example 582 of the structured ID is an example in which the displayed range (designated root) is made as a world map, and the level of detail for the display of the structured ID is changed in connection with the map. In the screen display examples 581 and 582, it is possible to change a center of the range which receives the attention, respectively. The center of the range which receives the attention is made as 100%, and the accumulated relative ratio indicating the evaluation value of the failure described above is recalculated, thereby, it is possible to display the damage which is received by the system at the time of the failure as a quantitative ratio in which the center is made as 100%.

In this manner, even if the content of the displayed contents such as the facility map information and the wide area map information is combined, it is possible to unitarily identify the management target by the structured ID. Even in a case where the fragmented information exists on the system, or a case where the identifiers are overlapped with respect to the same target, the management is performed by associating the structured ID with each information, thereby, it is possible to uniquely manage the information in the system.

(5) Management Range Setting Processing

Next, with reference to FIG. 7A, a management range setting processing in the HMI terminal (HMI-α 500, HMI-β 600, and HMI-γ 700, there may be a case of being described merely as an HMI terminal, hereinafter) of each vendor will be described. At the time of describing the management range setting processing of FIG. 7A, an outline of the structured ID data indicating the management range of FIG. 7B will be appropriately referred.

As illustrated in FIG. 7A, an owner identifier is input from the HMI terminal, and a login is performed to the management server 800 (S001). By the login processing in step S001, the structured ID managing unit 811 of the management server 800 obtains the information for individually recognizing the HMI terminal by an owner unit.

The structured ID managing unit 811 transmits the structured ID data 874 indicating the entire range which relates to the owner identifier to the HMI terminal (S002). The structured ID data of the entire range that is transmitted to the HMI terminal from the structured ID managing unit 811, may be described by the tree structure 814 illustrated in FIG. 2, but in the following description, it will be described by using the structured ID data 874A of the entire range of the system configuration which is decomposed into a path unit as illustrated in FIG. 3 as an example.

Therefore, a scaled numerical value which is obtained with a scroll operation or the like by the setting item input unit 512 of the HMI terminal is associated with the path length 814P1 of the management range, and the level of detail for the management of the management range structured ID data 513 is changed (S003). As illustrated in 874A (S003) of FIG. 7B, in step S003, for example, as a path length 814P1, the definition 814*a* of the platform vendor, and the definition 814*b* of the component vendor A Corp. are set.

By the setting item input unit 512 of the HMI terminal, the number of listings of the structured ID path of a monitoring target is increased or decreased, and the management range of the management range structured ID data 513 is changed (S004). As illustrated in 874A (S004) of FIG. 7B, the management range is designated, by determining 814L1 to 814L6 of the number of paths in the management range.

By the setting item input unit 512 of the HMI terminal, the designated root location of the structured ID of the monitoring target is set, the path width from the set designated root is designated, and the level of detail for the management of the management range structured ID data 513 is changed (S005). As illustrated in 874A (S005) of FIG. 7B, by changing the designated root location of the structured ID, it is possible to change the level of detail of the management target.

Therefore, the management range structured ID data 513 along with the owner identifier from the HMI terminal is transmitted to the management server 800, and the management range structured ID data 513 is registered into the management server 800 (S006). The management range structured ID data 513 is registered into the management server 800 by being transmitted to the management server 800, thereby, it is possible to obtain the information on the display screen of the set management range, at the time of the next-time login from the HMI terminal.

The structured ID managing unit 811 transmits the correlation data 873 relating to the management range structured ID data 513 to the HMI terminal (S007). In step S003 to step S005 described above, in a case where the management range is set or changed, the correlation data 873 is also changed in accordance therewith. Therefore, each layer in which the structured ID that is included in the management range structured ID data 513, 613, or 713 which is received by the structured ID managing unit 811 is defined, transmits the correlation data 873 to each HMI terminal.

Here, with reference to FIG. 8A and FIG. 8B, the content of the correlation data which is transmitted in step S007 will be described. FIG. 8A is an example of the correlation data indicating the relation between the vendor unique failure ID and an abstraction failure ID as the correlation data.

The following three points have a big influence on the difficulty of the system management including the multi-architecture in recent years. Firstly, there is a point (one-to-one relation) of a need to manage which meaning is included in the definition of the failure ID since the definition of the component vendor unique failure ID is changed depending on firmware replacement or update, secondly, there is a point (multi-to-one relation) in which a plurality of failure detecting mechanisms exist, and a plurality of failure IDs mean the failure of one target, and thirdly, there is a point (one-to-multi relation) in which the failure ID that is defined by the component vendor means the failure in a case of using a plurality of apparatuses as a target in the system.

With reference to FIG. 8B, a first relation to a third relation described above will be described. As illustrated in FIG. 8B, the one-to-one relation is a relation (873Link1) in which the definition of the component vendor unique failure ID is associated with one of the universally manageable abstract failure ID and the universally manageable trouble location ID that are defined by the platform vendor. The multi-to-one relation is a relation (873Link2, 873Link3) in which the definitions of the plurality of component vendor unique failure IDs are associated with one failure ID or one trouble location ID that is defined by the platform vendor. The one-to-multi relation is a relation (873Link4, 873Link5) in which the definition of one component vendor unique failure ID is associated with a plurality of failure IDs or trouble location IDs that are defined by the platform vendor.

Since the first relation to the third relation described above may not be represented only by the parent-child relationship of the tree structure of the structured ID, by using the path decomposition data of the structured ID, there is a need to manage a cause-to-effect relationship between the paths, or to manage the meaning of the failure ID as the relation information.

In the embodiment, by the correlation data illustrated in FIG. 8A, the first relation to the third relation are managed. As illustrated in FIG. 8A, Name of the correlation data 873 indicates a link source. That is, Name indicates the definition 814*b* of the component vendor unique failure ID. Link of the correlation data 873 indicates a link destination. That is, Link is the structured ID of universally manageable abstract failure which is defined in the platform vendor, or the structured ID 814*a* of the trouble location itself. In this manner, by defining the correlation between the failure information and the configuration elements, it is possible to flexibly define the relations which are made as a one-to-one relation, a one-to-multi relation, a multi-to-one relation, or a multi-to-multi relation between the vendor unique failure ID and the abstraction failure ID.

The information indicating the relations becomes know-how in the system management on designing or reconstructing the system. That is, by maintain the relations, it is possible to share the information among the vendors, or it is possible to clarify a degree of the influence on the system which is provided by other vendors. By accumulating the information indicating the relations, it is possible to enhance an intelligence quotient for managing the system which is provided by the plurality of vendors, and it is possible to manage all system in a unified manner.

In the same manner as the relation information of the failure ID described above, the relation information between a location of a configuration control program and the structured ID indicating the failure ID which becomes the target, the relation information between the vendor unique failure ID and a failure spread range thereof, the relation information between the failure and a responsibility range of the owner, the relation information between the location of the configuration control program and a range where the configuration control is affected, and the like may be defined.

Next, with reference to FIG. 9A, a completeness verification processing of the management range and a relational link will be described. By the processing, it is possible to verify whether or not the management range which is flexibly set by the operator is leaked into the monitoring target. At the time of describing the processing, the content of the structured ID accumulated data 874 in the entire range of FIG. 9B will be appropriately referred.

As illustrated in FIG. 9A, the structured ID managing unit 811 reads the structured ID accumulated data 874 in the entire range of the system configuration, and it is possible to perform the processing on the memory as a structured ID data 814 in the entire range of the system configuration (S010).

The structured ID managing unit 811 clears all values of the evaluation value 874C of the structured ID accumulated data 874 to zero, and adds the evaluation value 874C of the structured ID that is registered in the management range structured ID data 513, 613, and 713 which are transmitted from each HMI terminal (HMI-α 500, HMI-β 600, and HMI-γ 700) one by one (S011).

The structured ID managing unit 811 verifies the subset of all management range structured ID data which are set by the management range setting processing on the entire range structured ID accumulated data 874 of the system configuration, and transmits the target of which the evaluation value 874C is zero to HMI terminal of the owner (S012). Specifically, the structured ID managing unit 811 notifies of a warning as a case where the management leakage exists in the HMI terminal of the owner 874B corresponding to the evaluation value 874C, with respect to the target of which the evaluation value 874C is zero, in the subset of the management range structured ID data.

In the example of FIG. 9B, in a structured ID 984A, since the evaluation value 874C of "all system/field apparatus" is zero, it is possible to grasp the leaking from the management target. Therefore, the warning is notified to the HMI terminal "γ" (HMI-γ 700) of the owner corresponding to the evaluation value 874C.

As a verification processing of the completeness of the relational link, the structured ID managing unit 811 clears all evaluation values of the evaluation value 874C to zero, sequentially reads the correlation data 873 relating to the management range structured ID data 513, 613, and 713, and adds the evaluation value 874C corresponding to the structured ID 874A which is designated as a link source and a link destination one by one (S013).

The structured ID managing unit 811 verifies the subset of all correlation data 873 on the entire range structured ID accumulated data 874 of the system configuration, and transmits the target of which the evaluation value 874C is zero to the HMI terminal of the owner, in an error definition of the target identifier 874D (S014). Specifically, the structured ID managing unit 811 notifies of the warning as a case where the correlational link setting leakage exists in the HMI terminal of the owner 874B corresponding to the evaluation value 874C, with respect to the target of which the evaluation value 874C is zero, in the subset of the correlation data 873.

In the example of FIG. 9B, in "PF vendor abstract error" of the target identifier 874D, since the evaluation values 874C of "rebootable abnormality", "vendor unique error ID", and "Error001" are zero, it is possible to grasp that the setting leakage in which an alarm or the configuration control may not be executed with respect to the failure, without depending on the relational link. Therefore, the warning is notified to the HMI terminals "α" (HMI-α 500) and "β" (HMI-β 600) of the owner corresponding to the evaluation values 874C.

By the setting of the management range, and the completeness verification processing of the management range and the relational link, in the management server 800, it is possible to execute the flexible management range setting processing, and further, by verifying whether or not the leakage exists into the monitoring target, with respect to the set management range, a preparation for receiving the failure information from the physical machine 100, the physical machine 200, and the field apparatus 1000 is completed.

(6) Failure Information Display Processing of Management Range

Next, with reference to FIG. 10A, in a case where the failure is generated, a failure information display processing of the management range in which an alarm display corresponding to the management range that is set by the HMI terminal of each vendor is performed will be described. At the time of describing the failure information display processing of FIG. 10A, the structured ID path of FIG. 10B will be appropriately referred.

FIG. 10B schematically illustrates composition and deletion of the structured ID path which are performed in the failure information display processing. If only each vendor grasps the failure ID, or each vendor does not know an own location thereof in all system, in a case where the operator is not capable of grasping all structured IDs such as a case where the platform is concealed as virtualization, there is a need to perform a connection processing or a cutting processing of the structured ID depending on the management range which is set by the operator.

As illustrated in FIG. 10A, the failure message generating unit 111 connects the path of the failure ID 814b of the A Corp. which is generated in the physical machine 100 to the path of the structured ID 814a indicating the physical machine 100 which is the management target, and generates a failure message which is uniquely defined in the path of the structured ID indicating the entire range of system configuration (S021).

The failure message generating unit 111 transmits the failure message which is generated in step S201, to the structured ID managing unit 811 of the management server 810 (S022). The structured ID managing unit 811 manages a failure region with the entire range structured ID data of the system configuration, and transmits the failure message to the HMI terminal that manages the failure region (S023). Specifically, the structured ID managing unit 811 specifies the HMI terminal of the owner that manages the failure region corresponding to the structured ID, from the structured ID data 513 of the management range which is registered by each HMI terminal, and transmits the failure message to the HMI terminal.

The failure spot determining unit 511 of the HMI terminal searches whether the structured ID of the target which is indicated by the failure message exists on the entire range structured ID data of the system configuration, and displays a warning mark on the matching target (S024).

The failure spot determining unit 511 of the HMI terminal obtains the structured ID of the link destination, from the correlation data 873 which is received from the structured ID managing unit 811, searches whether the structured ID of the target which is indicated by the failure message exists, and display the warning mark on the matching target (S025). The display of the warning mark in step S024 and step S025 will be described with reference to FIG. 11.

The failure spot determining unit 511 of the HMI terminal determines whether the matching structured ID does not exist in the management range structured ID data 874 nor the correlation data 873 (S026). In step S026, a case where the matching structured ID does not exist in the management range structured ID data 874 nor the correlation data 873 means a case where an unknown failure identifier is delivered due to the firmware update or the setting defectiveness of the management target.

In step S026, in a case where it is determined that the matching structured ID does not exist in the structured ID data 874 of the management range nor the correlation data 873, the processing after step S027 is executed. On the other hand, in a case where it is determined that the matching structured ID exists in both of the structured ID data 874 of the management range and the correlation data 873, the processing is ended.

In step S027, the failure spot determining unit 511 of the HMI terminal deletes the child element of the structured ID 814P3 of the target that is indicated by failure message which is received from the structured ID managing unit 811, by one (S027).

In step S027, it is determined whether to exist the structured ID matching with the structured ID of the failure message in which the child element is deleted (S028).

Normally, with respect to the failure message having the unknown failure ID, only an else statement of the program command, or a command in a default statement is executed. Therefore, it is not determined which failure spot is associated with the failure message, and it is only possible to notify the vendor relating to the failure message of the occurrence of an exceptional case.

However, in the embodiment, the failure spot is estimated by enlarging and interpreting the failure corresponding to the failure ID, and it is searched whether to exist any structured ID matching with the failure ID. In a case where the matching target exists, it is possible to display the warning mark on the matching target. Accordingly, with respect to the failure message for only notifying of the purport that the exceptional case is generated in the related art, not only it is possible to notify the vendor relating to the failure message, but also it is possible to promptly grasp whether any apparatus relates to in a case where the failure is generated.

In step S028, in a case where the matching structured ID does not exist even if the child element of the structured ID of the failure message is deleted, the gradual deletion (S027) and the search (S028) of the child element are repeatedly carried out, until the arrival is made at the root of the structured ID of the failure message. In step S028, in a case where the matching structured ID exists, the warning mark is displayed on the target corresponding to the structured ID (S029).

In this manner, with respect the structured ID of the failure message, by performing the search until the matching structured ID exists, even in a case where the unknown failure ID such as the replacement of the firmware, the addition of a security patch, or a remote update is added, it is possible to associate the failure ID with any element of the structured ID, thereby, it is possible to prevent the management leakage.

Next, with reference to FIG. 11, a display example of the failure region and the spread range that are displayed in the determination result display apparatus of each HMI terminal by the failure information display processing described above will be described. In the structured ID, the quantitative evaluation value is set to each element. Therefore, by calculating the sum total of the evaluation values at the trouble location, it is possible to display the degree of the system damage after the failure is generated as an evaluation value (display screen example 583).

By reflecting the failure spread relation into the structured ID from the relation information, for example, it is possible to display that the failure of 1% spreads to 40% (display screen example 584). In the screen display example 584 of FIG. 11, the failure region is indicated by a circle, and the failure spread range is indicated by an asterisk. The spread range is included, and the configuration control program and the target range thereof are selected, thereby, it is possible to cause the apparatus or the program which correctly operates to execute the configuration control processing. In this manner, by performing the tracing from a root node of the structured ID, and by checking a normal state or an abnormal state with scanning, it is possible to evaluate the failure range towards the level of detail from a more comprehensive viewing field.

(7) Failure Recovery Command Collision Avoiding Processing and Configuration Control Executing Processing Next, with reference to FIG. 12, a failure recovery command collision avoiding processing, and a configuration control executing processing using the structured ID will be described. The failure spot determining units 511, 611, and 711 of the respective HMI terminals receive the determination result of the failure spot described above, and transmit a restart command of the failure spot to the structured ID managing unit 811 (S030).

The structured ID managing unit 811 reflects the failure information into the correlation data 873, and updates range information which is the failure or may be the failure (S031).

The structured ID managing unit 811 determines whether the parent element between the structured ID of the target of the restart command and the root of the structured ID path is already the failure, or may be the failure (S032).

In step S032, in a case where it is determined that the parent element is already the failure, or may be the failure, the purport that the restart command is not permitted is notified to the failure spot determining units 511, 611, and 711 of the HMI terminals (S033). The structured ID managing unit 811 sequentially searches for the parent element in which the failure may not spread from the root of the structured ID path, and notifies of the parent element in which a restart processing is comprehensively executable as a candidate (S034).

On the other hand, in a case where it is determined that the parent element is not the failure, or may not be the failure, the structured ID managing unit 811 confirms whether the failure spot, and the element in a state of executing the restart processing do not exist under the control, transmits the command to the command discriminating and executing unit 112, and manages the failure spot as a state of being restarted (S035). The command discriminating and executing unit 112 excludes an amount of the differential structured ID data 113, generates the structured ID 114 which can be interpreted and executed by the physical machine 100, and executes the restart with respect to the target thereof (S036). The command such as a forced restart from the outside may be executed as long as the target onto which the restart command is processed is normal.

(8) Modification Screen Example of System Configuration

Next, with reference to FIG. 13, a case where the system configuration is partially changed by using the existing structured ID information or the existing relation information will be described. Due to a pointer 681 of a mouse, the parent element of the component of a modification target is selected (physical machine 1 is selected in the drawing). By selecting the physical machine of a C Corp. with the pointer 681 of the mouse, it is possible to rearrange the component to the C Corp. physical machine from the A Corp. physical machine. At this time, the amounts of the deletion and the addition of the quantitative evaluation value of the structured ID of a replacement target, and the relation information, are displayed on the HMI terminal by being quantitatively evaluated.

Even when the system is designed for the first time, in the same manner, the parent element is selected with the pointer 681 of the mouse, and the component or the business service to be used is added, thereby, it is possible to design the system.

(9) Effects of the Embodiment

As described above, according to the embodiment, in a case where the structured identification information indicating the failure information which is generated in the system corresponds to the subset of the structured identification information which is designated as a management range, in the structured identification information, based on the structured identification information indicating the physical and logical inclusion relations of the configuration elements which configure the system by the tree structure, and the correlation information indicating the information on the correlation between the configuration elements, it is possible to cause the failure information which is generated in the system to be displayed on the terminal that displays the management range, it is possible to set the structured identifier information (structured ID) with the child structure in which the identifiers of the configuration elements of the systems that are individually designed are adapted to the system structure, and it is possible to perform the management in a unified manner by the tree structure.

Accordingly, the multi-architecture is included, the gradual design of the system is supported, and the system design data is managed in a unified manner, thereby, it is possible to prevent the overlapping of the configuration control, or the occurrence of the leakage of the control range. In the operation of the system, it is possible to quantitatively calculate the severity of the system, and it is possible to provide the reliability evaluation value of the system. It is possible to manage the failure ID which has high dependency on the vendor, and is less likely to be unified, based on the relation information of the structured ID including the failure ID.

In the field of the system management, at the time of constructing the display screen that fits in the attention level of the operator, by dynamically combining the management functions with each other, or by designating the display range of the structured ID, it is possible to flexibly manage up to the vendor unique failure identifier management from the management with the abstract concept in which the plurality of vendors are concealed.

In the life cycle management of the system in accordance with the multi-architecture, by quantitatively calculating the amount of the relation information that is deleted or added depending on the increase or decrease of the structured ID of the element which configures the system, or the increase or decrease of the structured ID, it is possible to quantitatively evaluate the configuration element which is reusable in the life cycle of the system.

REFERENCE SIGNS LIST 100, 200 PHYSICAL MACHINE
120, 130 COMMUNICATION INTERFACE
110, 210 MEMORY
111, 211 FAILURE MESSAGE GENERATING UNIT
112, 212 COMMAND DISCRIMINATING AND EXECUTING UNIT
300, 400 MULTI-THREAD NETWORK
500 HMI-α FOR PLATFORM VENDOR
600 HMI-β FOR COMPONENT VENDOR
700 HMI-γ FOR BUSINESS SERVICE VENDOR
510, 610, 710 MEMORY 512, 612, 712 SETTING ITEM INPUT UNIT
513, 613, 713 MANAGEMENT RANGE STRUCTURED ID DATA
580, 680, 780 DETERMINATION RESULT DISPLAY APPARATUS
800 MANAGEMENT SERVER
820, 830, 840 COMMUNICATION IF
810 MEMORY
811 STRUCTURED ID MANAGING UNIT
814 STRUCTURED ID DATA
850 CPU
860 BUS
870 DISK INTERFACE
871 STORAGE APPARATUS
873 CORRELATION DATA
874 STRUCTURED ID ACCUMULATED DATA
900 WIDE AREA NETWORK SUCH AS INTERNET
1000 FIELD APPARATUS
1100 MANAGEMENT SYSTEM

The invention claimed is:

1. A system management apparatus that manages a system comprising a plurality of management target systems of different vendors having a plurality of configuration elements, the system management apparatus comprising:
 a management server coupled to an interface that is coupled to the configuration elements of the target management systems, said management server having a processor and memory that stores instructions for configuring the processor to:
  store structured identification information received from the vendors for each of the configuration elements owned by the respective vendors that includes information of dependency relationships of each of the configuration elements in a tree structure,
  store a subset of the stored structured identification information of the configuration elements owned by each of the vendors as a management target range of the structured identification information set by the vendors corresponding to the management target systems of the vendors,
  store correlation information which associates, for each one of the vendors, the structured identification information for the one vendor with failure identification information for another of the vendors;
  receive, in a case where a failure has occurred at a predetermined configuration element of a specific management target system among the plurality of management target systems, the structured identification information of the predetermined configuration element with failure identification information for a specific one of the vendors, and
  specify the configuration elements which are supposed to receive influence of the failure which has occurred at the predetermined configuration element on the basis of the information of the stored dependency relationships of each of the configuration elements and the stored correlation information.

2. The system management apparatus according to claim 1,
 wherein the processor of the management server is further configured to define each of the configuration elements by a path from a root node to a leaf node of the tree structure and to set the management target range of the structured identification information corresponding to the management target systems of the vendors by:
  designating a path length of the paths of the configuration elements indicated by the tree structure,
  designating a path width of the paths of the configuration elements obtained by changing a designated position of the root node of the tree structure, and
  designating a range level of the management target range by specifying a number of paths of the tree structure.

3. The system management apparatus according to claim 2,
 wherein the processor of the management server is further configured to store the structured identification information, vendor owner information for managing the configuration element of the management target system which is indicated in the structured identification information, an evaluation value that is obtained by evaluating the configuration element, and information indicating a type of the configuration element.

4. The system management apparatus according to claim 1, further comprising terminals for each of the vendors having a display, a processor and a terminal memory which stores instructions that when executed by the terminal processor configure the terminal processor to accept vendor input of the configuration elements owned by the vendor,
 wherein in the correlation information, failure identification information for identifying the failure is associated with the structured identification information indicating the configuration element of the management target system relating to the failure identification information, and
 in a case where the structured identification information relating to the failure identification information that corresponds to the failure is included in the subset of the structured identification information which is designated in the management target range, the processor of the management server is further configured to transmit the failure identification information to the terminal that displays the management range.

5. The system management apparatus according to claim 4,
 wherein the processor of the management server is further configured to generate a display of a percentage of failure of the configuration elements in the management target system compared with the failure of the configuration elements of all of the plurality of the management target systems on a display screen of the vendor terminal that displays the management target range having the generated structured identification information.

6. The system management apparatus according to claim 1,
 wherein the processor of the management server is further configured to:
  generate the structured identification information that is defined in the management target system, from the failure identification information for identifying the failure which has occurred in the management target system, and the structured identification information indicating the configuration element where the failure is generated, and
  specify a configuration element that matches with or relates to the generated structured identification information, based on the stored structured identification information and the stored correlation information.

7. The system management apparatus according to claim 6,
 wherein the processor of the management server is further configured to gradually delete a tree structure which configures the generated structured identification information, when a configuration element is not specified that matches with or relates to the generated structured identification information, and specify a configuration element that matches with or relates to the deleted structured identification information, based on the structured identification information and the stored correlation information.

8. A system management method for managing a system comprising a plurality of management target systems of different vendors having a plurality of configuration elements, the system management method comprising:

storing structured identification information received from the vendors for each of the configuration elements owned by the respective vendors that includes information of dependency relationships of each of the configuration elements in a tree structure, storing a subset of the stored structured identification information of the configuration elements owned by each of the vendors as a management target range of the structured identification information set by the vendors corresponding to the management target systems of the vendors, storing correlation information which associates, for each one of the vendors, the structured identification information for the one vendor with failure identification information for another of the vendors;

receiving, in a case where a failure has occurred at a predetermined configuration element of a specific management target system among the plurality of management target systems, the structured identification information of the predetermined configuration element with failure identification information for a specific one of the vendors, and specifying the configuration elements which are supposed to receive influence of the failure which has occurred at the predetermined configuration element on the basis of the information of the stored dependency relationships of each of the configuration elements and the stored correlation information.

* * * * *